(12) United States Patent
Steinberg (10) Patent No.: US 6,209,973 B1
(45) Date of Patent: Apr. 3, 2001

(54) COMPUTER MONITOR COVER

(76) Inventor: Kari Frances Steinberg, 224 24th St., Santa Monica, CA (US) 90402

( * ) Notice: Subject to any disclaimer, the term of this patent is extended or adjusted under 35 U.S.C. 154(b) by 0 days.

(21) Appl. No.: 09/176,494

(22) Filed: Oct. 21, 1998

(51) Int. Cl.$^7$ .................................................. A47B 5/00
(52) U.S. Cl. .................... 312/7.2; 312/204; 312/223.2; 348/841; 348/842
(58) Field of Search ................... 312/7.2, 223.2, 312/204; 348/836, 839, 841, 842; 135/93, 117; 52/3, DIG. 14

(56) References Cited

U.S. PATENT DOCUMENTS

| | | |
|---|---|---|
| D. 323,929 | 2/1992 | Hodson . |
| D. 338,884 | 8/1993 | Toedter . |
| D. 373,962 | 9/1996 | Nagai et al. . |
| 1,340,863 | 5/1920 | Knight . |
| 2,704,903 | 3/1955 | Laughlin . |
| 3,507,416 | 4/1970 | Douglas et al. . |
| 4,206,575 * | 6/1980 | Leonard ................................. 52/3 X |
| 4,607,674 | 8/1986 | Noble . |
| 4,736,418 | 4/1988 | Steadman . |
| 4,921,103 | 5/1990 | Cohen . |
| 4,922,980 | 5/1990 | Parker . |
| 4,932,524 | 6/1990 | Hodson . |
| 4,954,384 * | 9/1990 | Hartwell ................................. 52/3 X |
| 5,002,184 | 3/1991 | Lloyd . |
| 5,072,998 | 12/1991 | Oh . |
| 5,155,627 | 10/1992 | Keehn et al. . |
| 5,163,870 | 11/1992 | Cooper . |
| 5,372,426 | 12/1994 | Broudy et al. . |
| 5,375,928 | 12/1994 | Yarng et al. . |
| 5,464,214 * | 11/1995 | Griffin ................................ 312/7.2 X |
| 5,502,582 | 3/1996 | Larson et al. . |
| 5,551,497 | 9/1996 | Stanley . |
| 5,564,209 | 10/1996 | Zagnoli . |
| 5,668,612 * | 9/1997 | Hung ................................. 348/842 X |
| 5,682,993 | 11/1997 | Song . |
| 5,706,940 | 1/1998 | Amarello . |
| 5,729,250 | 3/1998 | Bishop et al. . |
| 5,758,019 | 5/1998 | Klopotek . |
| 5,759,644 | 6/1998 | Stanley . |
| 5,772,293 | 6/1998 | Hughes . |
| 5,825,347 * | 10/1998 | Prinsen ................................ 348/836 X |

* cited by examiner

Primary Examiner—Anthony Knight
Assistant Examiner—Karlena D. Schwing
(74) Attorney, Agent, or Firm—Milbank, Tweed, Hadley & McCloy, LLP (57) ABSTRACT

A cover for a computer monitor housing having a visual display screen is disclosed. The cover includes a containment member having a top panel and a pair of side panels attached thereto. The containment member is substantially constructed of fabric material and is adapted to receive at least a portion of the computer monitor housing. Coupled to the top panel and the side panels of the containment member is a front panel adapted to overlay the screen of the computer monitor housing. Further, a plurality of appendages are attached to the containment member.

31 Claims, 10 Drawing Sheets

COMPUTER MONITOR COVER

DESCRIPTION

1. Technical Field

The present invention relates to a cover for a computer monitor, and in particular to a cover which both visually entices a user of the monitor and also protects the monitor. The cover can be used concurrently with the monitor when it is in an active state and protects the monitor against thermal shock.

2. Background of the Invention

Numerous covers have been developed for protecting electronic components, such as computer monitors. For example, U.S. Pat. No. 5,772,293 to Hughes discloses a dust cover for a computer component, such as a computer monitor. U.S. Pat. No. Des. 323,929 to Hodson discloses an ornamental design for a computer cover. U.S. Pat. No. 5,163,870 to Cooper discloses a protective dust cover for computer components. U.S. Pat. No. 5,002,184 to Lloyd discloses a laptop computer cover constructed of a molded foam material for protecting the computer from impact loading. U.S. Pat. No. 4,921,103 to Cohen discloses a ventilated rack case for electronic equipment. However, none of these patents discloses a computer monitor cover which is visually appealing to entice the user of the equipment.

Decorations have been developed to make computer monitors more visually appealing. For example, U.S. Pat. No. 5,564,209 to Zagnoli discloses a decorative attachment for placement on a computer monitor. U.S. Pat. No. 5,072,998 to Oh discloses stuffed anatomical members of a character such as a bear, for mounting on a computer monitor. However, neither of these patents disclose a computer monitor cover which provides protection to the computer monitor.

The present invention is provided to overcome these and other problems.

SUMMARY OF THE INVENTION

It is an object of the present invention to provide a cover for a computer monitor which is both visually appealing and protective. The cover provides easy access to the computer monitor's display screen and reduces the adverse effects of thermal shock due to rapid cooling of the monitor.

In accordance with the present invention, a cover is provided for covering a computer monitor having a visual display screen. The cover includes a containment member having a top panel and a pair of side panels attached thereto. The containment member is substantially constructed of a material, such as fabric, and is adapted to receive the monitor. If desired, a front panel is coupled to the top panel and the side panels of the containment member. The front panel overlays the monitor screen. Further, a plurality of appendages are attached to the containment member.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
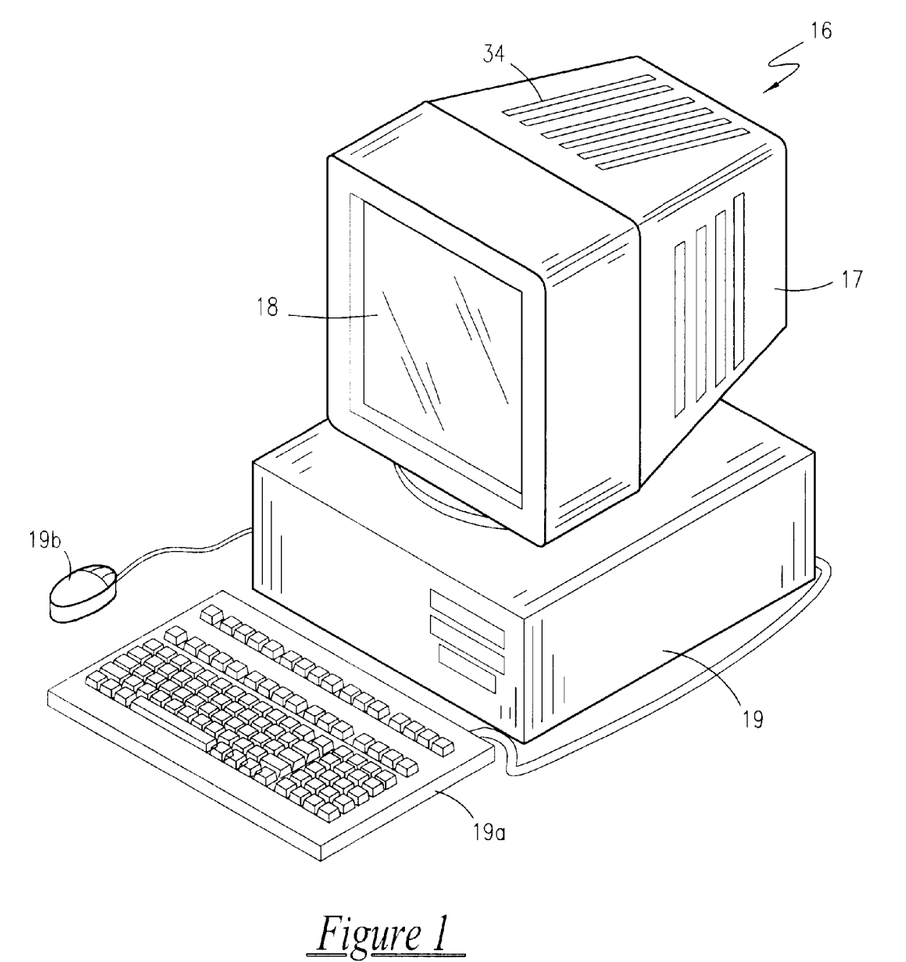
FIG. 1 is a perspective view of a computer system.

A computer system 16 is illustrated in FIG. 1. The computer system 16 includes a monitor 17 having a display screen 18, and a CPU casing 19. The computer system 16 further includes a keyboard 19a and a mouse 19b.

Figure 2A:
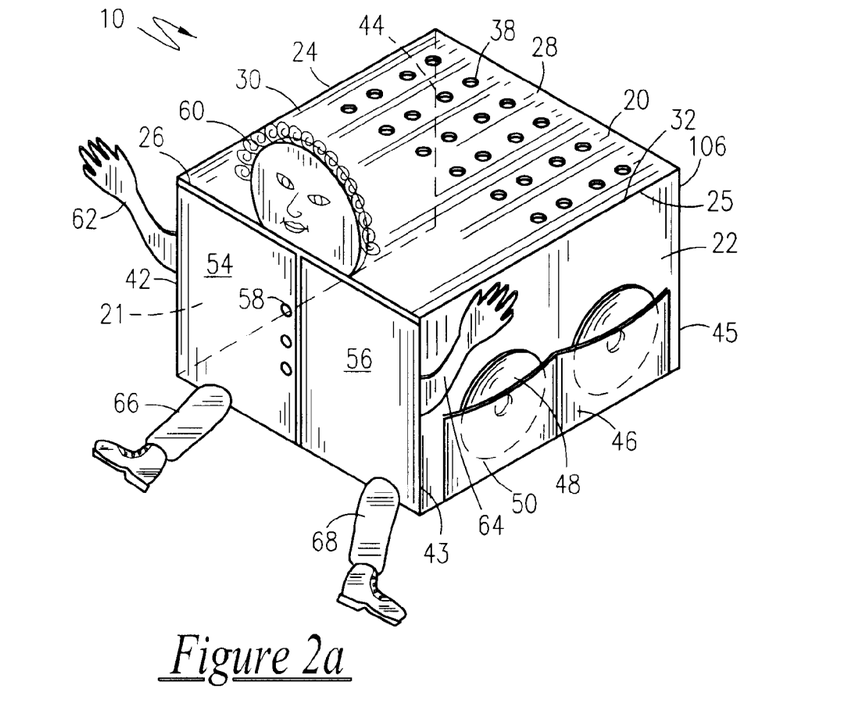
FIG. 2a is a perspective front view, partially in phantom, of a computer monitor cover in accordance with the present invention.

Referring to FIG. 2a, a cover 10 for the monitor 17 is illustrated. The cover 10 is constructed of a pliable material, such as a woven fabric. Preferably, the fabric is plush and constructed of a fire-retardant and static-free cotton/lycra blend, although other materials could be used.

The cover 10 loosely covers the corresponding top and sides areas of the monitor 17. It should be understood that the monitor 17 can be integral with the CPU casing 19, such as in an APPLE MACINTOSH computer, or it can include other computer peripherals, such as detachable speakers.

The cover 10 includes a top panel 20 and a pair of generally perpendicularly extending side panels 21, 22. The top panel 20 is positioned and attached between the side panels 21, 22. The top panel 20 and its respective side panels 21, 22, can be integral or, alternatively, stitched together along respective side edges 24, 25.

The top panel 20 is dimensioned to cover the top of the monitor 17 in its entirety. The top panel 20 is generally rectangular with a top panel front 26, a top panel back 28, and two top panel sides 30, 32 that are in spaced, substantially parallel relationship to each other.

The top panel 20 preferably permits ventilation of the monitor 17 by cooperating with vents 34 (FIG. 1) in the top of the monitor 17. As such, the top panel 20 of the cover 10 can have a plurality of perforations 38 formed therein. Alternatively, as discussed in greater detail below, the top panel 20 may include a permeable material such as netting or mesh that permits convective flow of air.

By providing for ventilation of the monitor 17 and also providing doors 54, 56 that can be opened for visually accessing the screen 18 of the monitor 17, the cover 10 can remain on the monitor 17 while in use. Likewise, the cover 10 can remain on the monitor 17, while in use, by omitting doors 54, 56 altogether.

As is well known, rapid temperature changes can adversely affect electronic equipment, such as computer monitors. Test results indicate that the operating temperature of the monitor 17 does not significantly increase when the cover 10 is mounted thereon. However, test results also indicate that the monitor 17, when covered by the cover 10, cools more slowly when turned off following use than when uncovered, reducing the thermal shock of too rapid cooling. Thus, the cover 10 reduces the effects of thermal shock to the monitor's electrical components.

Figure 2B:
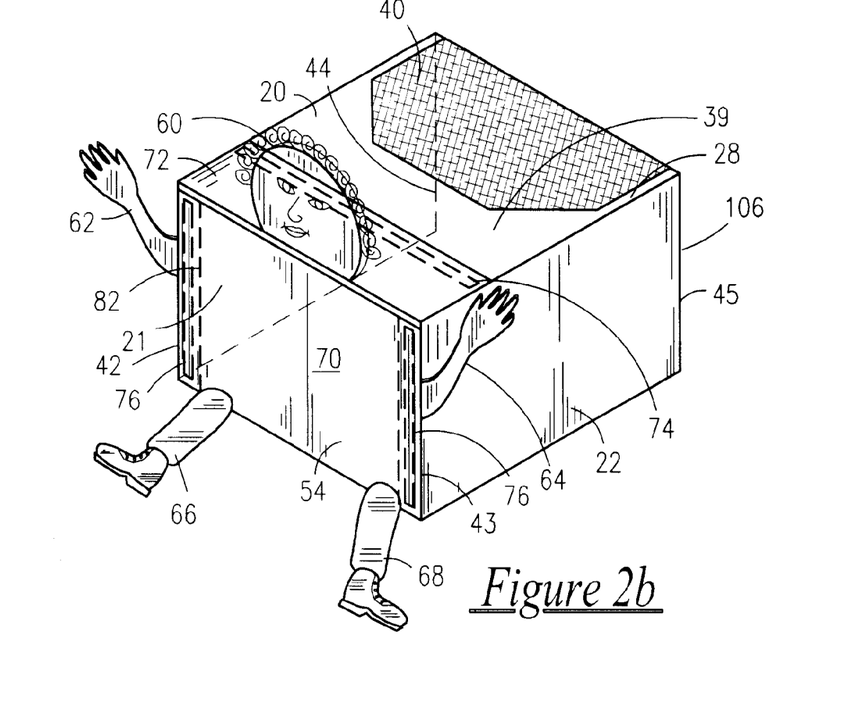
FIG. 2b is a perspective front view, partially in phantom, of a second embodiment of a computer monitor cover in accordance with the present invention.

In another embodiment illustrated in FIG. 2*b*, the top panel 20 can be bifurcated into a front portion 39 and a back portion 40. The front portion 39 is constructed of the same material as the side panels 21, 22. The back portion 40 is constructed of permeable material, such as netting or mesh that permits convective flow of air.

Referring again to FIG. 2*a*, the side panels 21, 22 are dimensioned to cover the sides of the monitor 17. Each of the side panels 21, 22 is generally rectangular and has a respective front corner edges 42, 43 and a respective back corner edges 44, 45.

Attached to at least one of the side panels 21, 22 are pockets 46 for holding various items such as, for example, compact disks 48, diskettes, files, or other computer related objects. The pockets 46 could alternatively be located on the doors 54, 56. The pockets 46 are preferably constructed of a strip 50 of material that is the same type used to construct the top 20 and the side panels 21, 22. The strip 50 forming the pockets 46 is generally the same length as the side panels 21, 22. The strip 50 is attached to one of the side panels 21, 22 by stitching.

The doors 54, 56 are attached to their respective front corner edges 42, 43. The doors 54, 56 are detachably coupled to each other by a connector, such as buttons 58, a zipper 59 (FIG. 9), or pile-type fasteners such as VELCRO. When the doors 54, 56 are coupled to each other, the screen 18 is hidden from view.

Stitched to the cover 10 are stuffed anatomically shaped members comprising a head 60, a right arm 62, a left arm 64, a right leg 66, and a left leg 68, forming the image of a character. While it is contemplated that the image would be that of an animate being, the image could be a plant, or some other image, the key being that the various members cooperatively form the image.

The head 60 is attached to the top panel 20 proximate to the top panel front 26. Preferably, the head 60 is centered. Correspondingly, the arms 62, 64 are attached generally along the respective front corner edges 42, 43. The legs 66, 68 are attached generally along the respective doors 54, 56.

Each of the stuffed anatomical members generally comprises a plush outer covering formed in the shape of an anatomical member and stuffed with a soft, resilient material such as cotton, polystyrene beads, or flexible polyurethane or similar suitable material.

Figure 3:
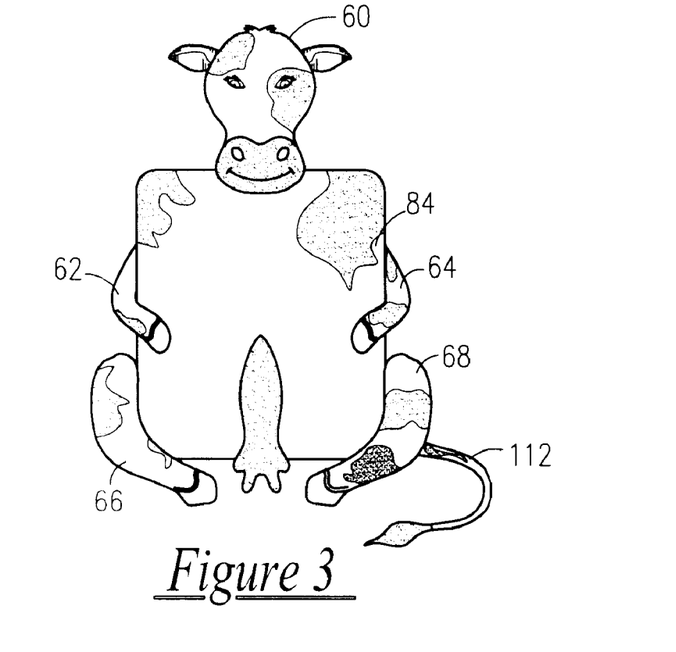
FIG. 3 is a front view of a cover having stuffed anatomically shaped members of a cow; attached thereto.
Figure 4:
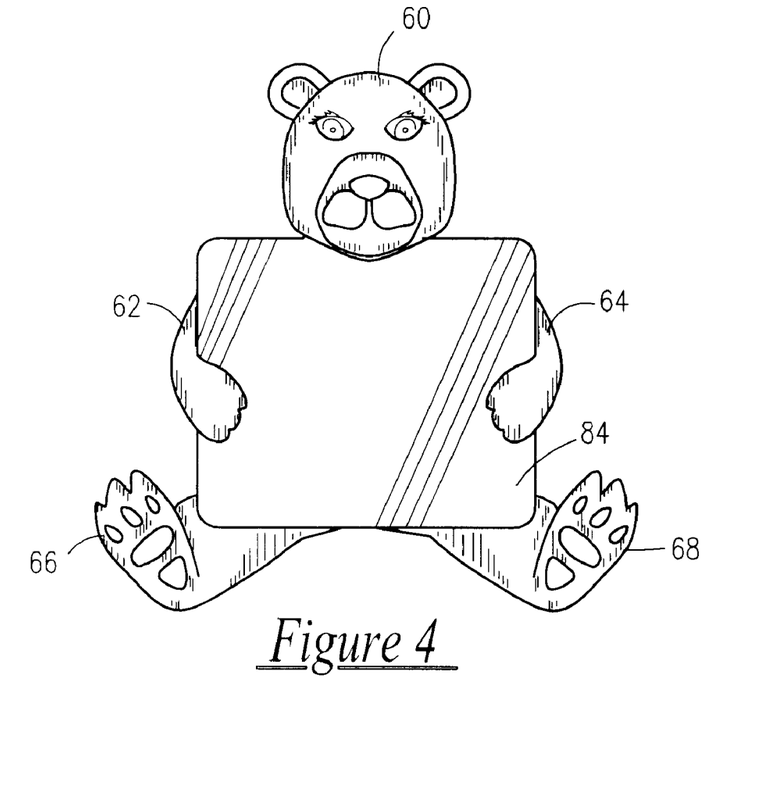
FIG. 4 is a front view of a cover having stuffed anatomically shaped members of a bear attached thereto.
Figure 5:
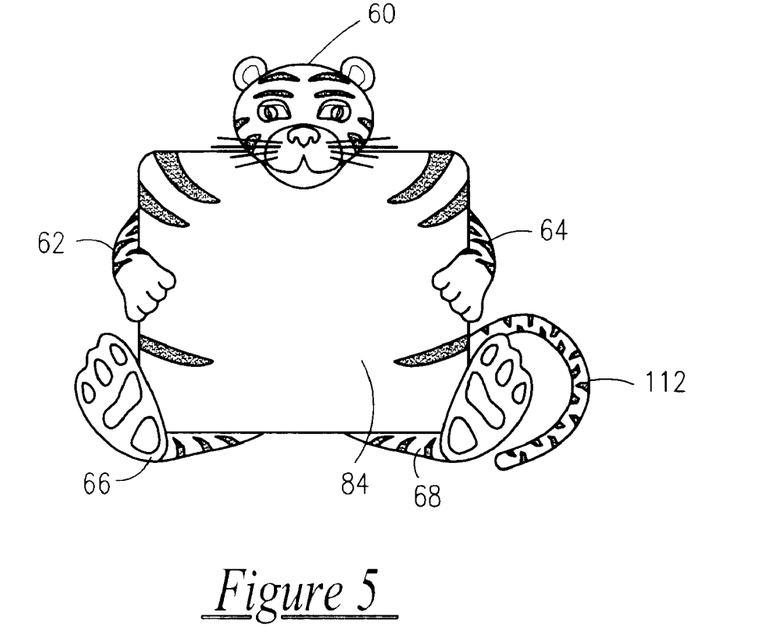
FIG. 5 is a front view of a cover having stuffed anatomically shaped members of a tiger attached thereto.
Figure 6:
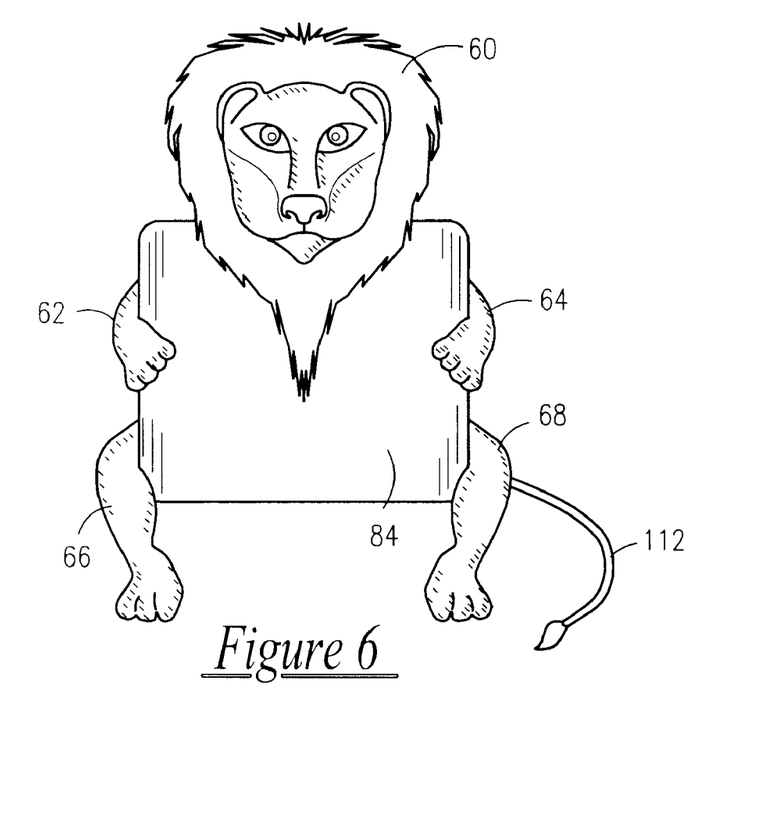
FIG. 6 is a front view of a cover having stuffed anatomically shaped members of a lion attached thereto.

The anatomical members cooperate to form images such as, for example, a person (FIGS. 1 and 2), a cow (FIG. 3), a bear (FIG. 4), a tiger (FIG. 5), a lion (FIG. 6), a dinosaur (FIG. 7), an elephant (FIG. 8), a dog (FIG. 9), or a rabbit. Other possible images include, but are not limited to, a cat, a mouse, a frog, a pig, an alligator, a zebra, a bird, a duck, a giraffe, a monkey, a butterfly, a turtle, a bull, a horse, a ram, a goat, a snake, a fish, a whale, a dolphin, an automobile, an airplane, a rocket, a penguin, a sheep, a shark, a bee, a beatle, a ladybug, a cockroach, an insect, a worm, a lizard, a crustacean, or a mermaid.

The anatomical members enhance the visual appeal of the cover 10. Moreover, the cover 10 provides a friendly appearance to the computer system 16, that entices children to use the computer system 16. The image may also be coordinated with an image actually being displayed on the screen 18. For example, a cow image on the cover 10 may be coordinated with a cow image utilized by the software, to enhance the apparent friendliness of the computer system 16 to children or other computer users.

In the embodiment of FIG. 2*b*, a single door 54' is removably mounted to the cover 10. The door 54' includes a generally planar front panel 70 with an integral top flap 72. The top flap 72 overlaps the top panel 20 of the cover 10. The top flap 72 is attached to the top panel 20 by fasteners such as VELCRO strips 74. The door 54' is also secured to the side panels 21, 22, by fasteners such as VELCRO strips 76.

The head 60 of the image is preferably attached to the outwardly facing surface of the flap 72. The arms 62, 64 of the image are attached to respective side panels 21, 22, respectively, proximate the respective front corners 42, 43. The legs 66, 68 of the image are attached to the door 54'.

Like the embodiment of FIG. 2*a*, the embodiment of FIG. 2*b* provides for ventilation of the monitor 17 and an easily opened front panel 70 for visually accessing the screen 18.

Figure 10:
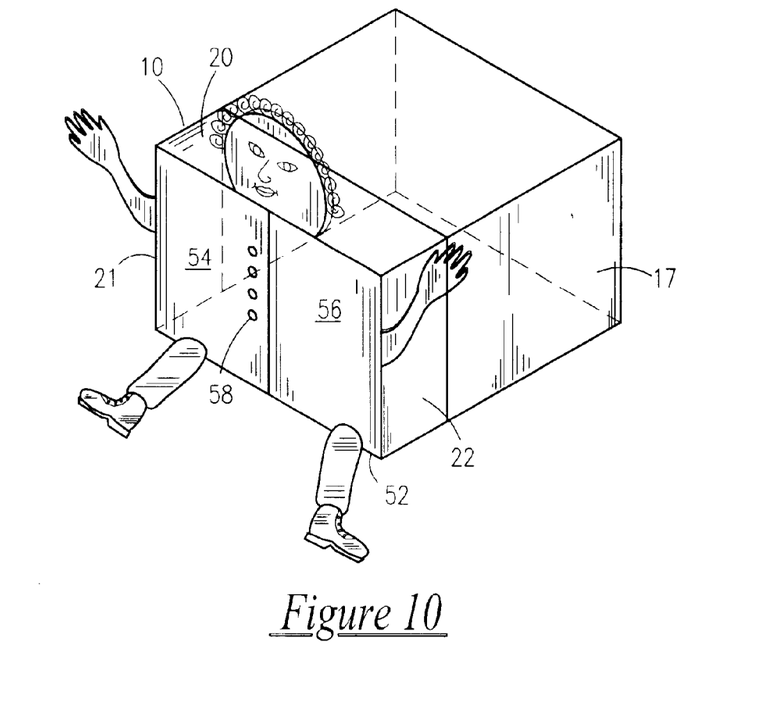
FIG. 10 is a front perspective view of a cover for only attaching to the front bezel of a computer monitor so that the screen of the monitor is concealed when not in use.

In a further embodiment, illustrated in FIG. 10, the top 20 and side panels 21, 22 of the cover 10 are shortened to only cover the front bezel of the monitor 17. The doors 54, 56 can be opened to view the screen 18. Likewise, when closed, the doors 54, 56 hide the screen 18 from view.

Figure 11:
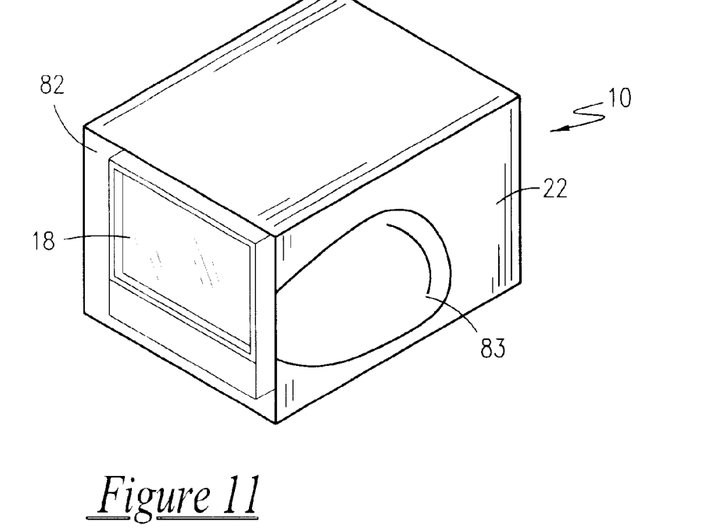
FIG. 11 is a front perspective view of a cover having a front panel consisting of a visually transparent screen.

In another embodiment, depicted in FIG. 11, a visually transparent screen 82 such as, for example, plexiglass or a glare or UV shield. The transparent screen 82 permits immediate viewing of the screen 18 without reconfiguring the cover 10. Moreover, portions of an image can be imprinted on the cover 10, such as mouse ears 83 located on sides 21, 22 (only one mouse ear on side 22 is shown). In an alternative embodiment, stuffed anatomical members can be attached to the cover 10, as discussed above, such as a pair of mouse ears.

Figure 12:
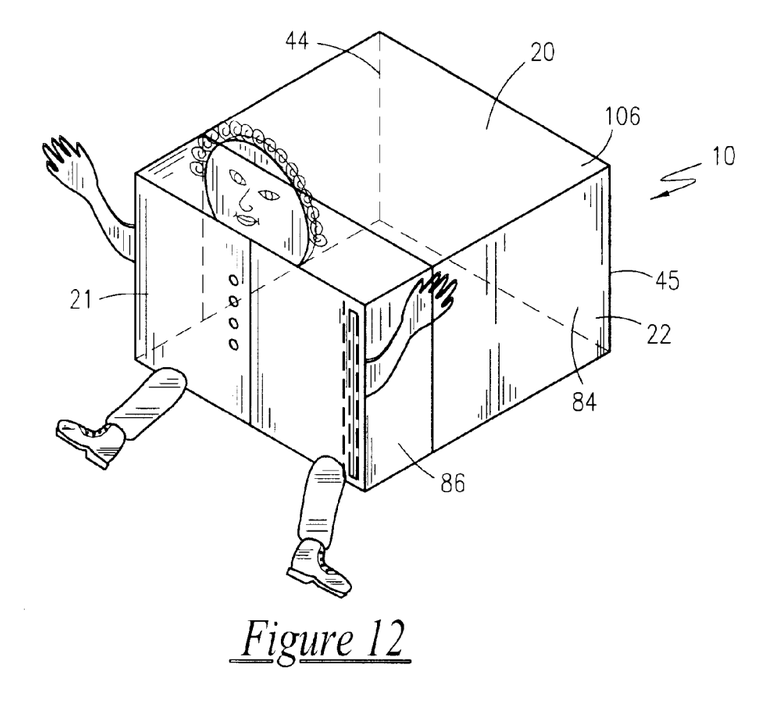
FIG. 12 is a front perspective view of a cover wherein the front panel is fixedly secured thereto.

In yet another embodiment, illustrated in FIG. 12, a front panel 84 is fixedly attached to the top 20 and side panels 21, 22 of the cover 10. Preferably, the front panel 84 is constructed of the same material as the side panels 21, 22. In this embodiment, the monitor 17 is received by the cover 10 via a bottom opening 86. Accordingly, to access the monitor 17, the cover is removed from the monitor 17.

Figure 13:
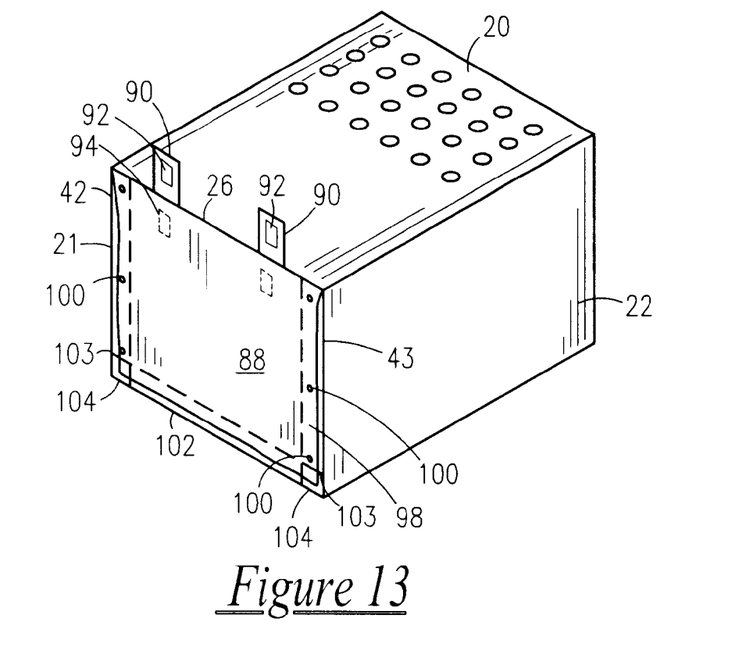
FIG. 13 is a front perspective view front view of a cover having a flap that is rolled-down for concealing the monitor screen.
Figure 14:
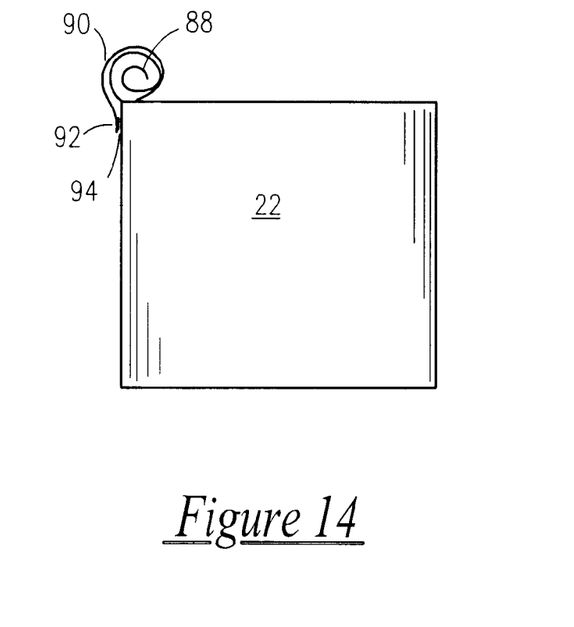
FIG. 14 is a side view of the cover of FIG. 13 with the flap rolled-up and secured in position by a pair of straps.

In still yet another embodiment, shown in FIG. 13, a flap 88 extends from the front of the top panel 20. The flap 88 can be integrally attached to the top panel 20 or attached by stitches or the like. The flap 88 is rolled-up to expose the screen 18 and is maintained in the rolled-up position by a pair of straps 90 and cooperating pile-type fasteners 92, 94. The straps 90 are attached to the top panel 20, proximate to the top panel front 26, and are fabricated from the same material as the cover 10. When the flap 88 is rolled up, as shown in FIG. 14, fastener pairs 92, 94 are secured to each other to maintain the position of the flap. Snap fasteners 100 secure the flap to the side panels 21, 22, when the flap 88 is unrolled.

Preferably, a strip 102 of material is stitched between the front corner 42, 43 and the terminal end 103 of each side panels 21, 22. The strip 102 is attached proximate to the bottom 104 of each of the side panel 21, 22 and maintains the box-like configuration of the cover 10 when mounted over the monitor 17.

As shown in FIGS. 2a and 2b, the cover 10 can include a rectangular back panel 106 attached to the top panel back 28 of the top panel 20 and the back edges 44, 45. The back panel 106 is constructed of the same material as the side panels 21, 22. The back panel 106 can be integral with one or more of the attached panels or, alternatively, can be attached by stitches or the like. The back panel 106 can be dimensioned to cover the entire back of the monitor 17, or a portion thereof.

In an alternative embodiment, the back panel 106 is constructed of a different material than the side panels 21, 22. For example the back panel 106 can be constructed of, a permeable material such as mesh that does not significantly impede convective air cooling of the monitor 17.

Figure 15:
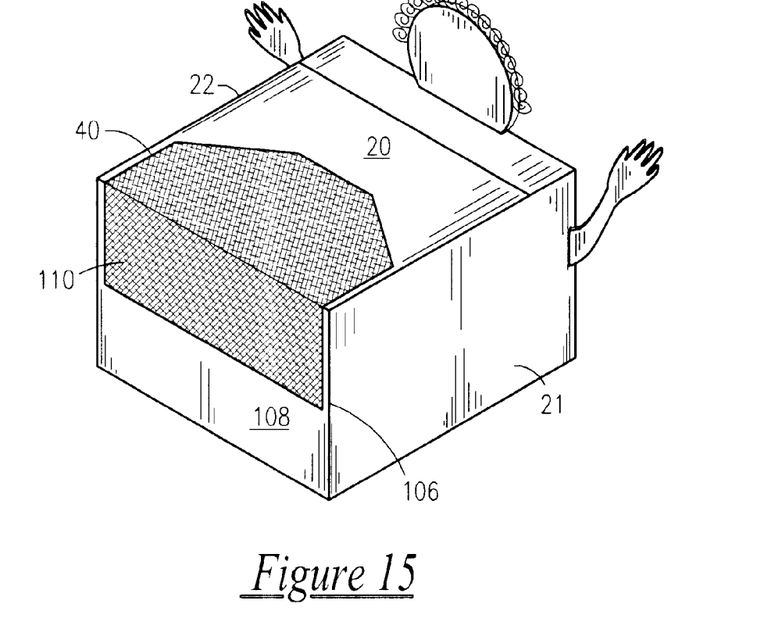
FIG. 15 is a rear perspective view illustrating the back and top panels of a cover partially constructed of a permeable material.

In still another embodiment, illustrated in FIG. 15, the back panel 106 can have a lower portion 108 constructed of the same material as the side panels 21, 22, but have an upper portion 110 consisting of a permeable material. The two portions 108, 110 of the back panel 106 are stitched together and, if desired, the permeable material portions of the top panel 20 and the back panel 106, respectively, can be a continuous web.

Figure 7:
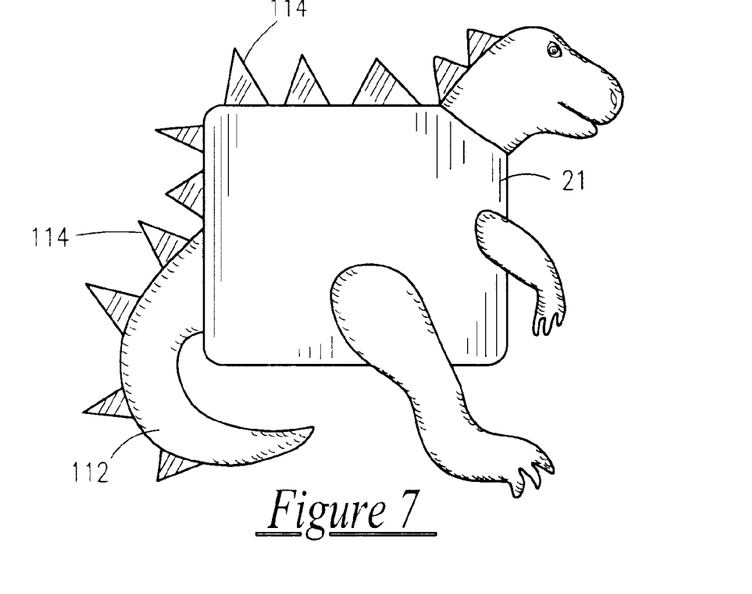
FIG. 7 is a side view of a cover having stuffed anatomically shaped members of a dinosaur attached thereto.
Figure 8:
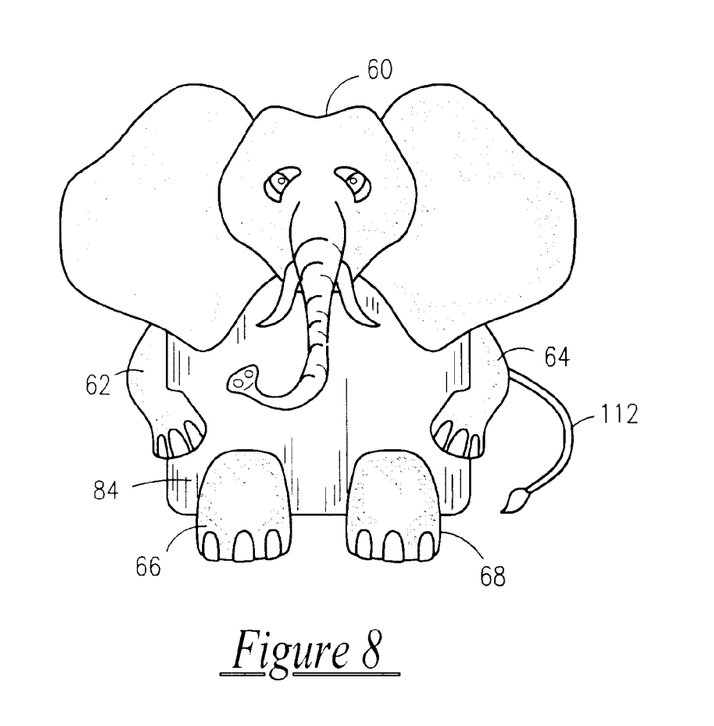
FIG. 8 is a front view of a cover having stuffed anatomically shaped members of an elephant attached thereto.
Figure 9:
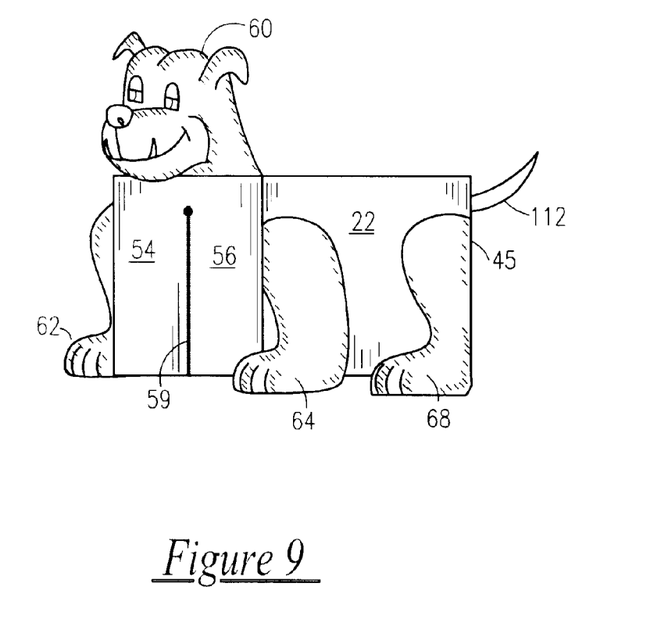
FIG. 9 is a perspective front view of a cover having stuffed anatomically shaped members of dog attached thereto and a zipper for opening the front panel.

As shown in FIG. 7, additional stuffed anatomically shaped members such as a tail 112 can be stitched to the back panel 106. Likewise, spikes 114 or other stuffed anatomically shaped members can be stitched to the top panel 20 and the back panel 106. Moreover, as shown in FIG. 9, the legs 66, 68 can be attached to the side panels 21, 22 proximate to the back edges 44, 45 (only one leg shown).

Figure 16:
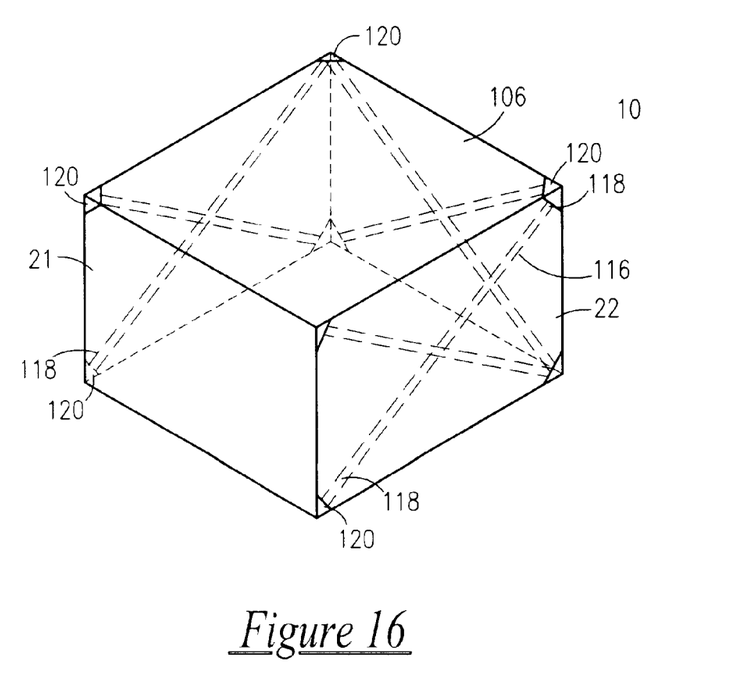
FIG. 16 is a front perspective view, partially in phantom, of a cover having support rods for maintaining the box-like structure of the cover.

Turning to FIG. 16, supports 116 can be used to provide rigidity to the cover 10. The supports 116 consist of beams or rods constructed of a rigid material such as wood, plastic, or the like. Preferably, two supports 116 cooperate with each side panel 21, 22 and, if included, back panel 106. The supports 116 associated with each panel cross each other and, accordingly, intersect generally in the center of the associated panel. The terminal ends 118 of each support 116 are received by pockets 120 at the corners of each panel. The pockets 120 are on the inner surface of each panel and consist of a generally triangular portion of fabric attached thereto with an opening for receiving the end of the support.

Figure 17:
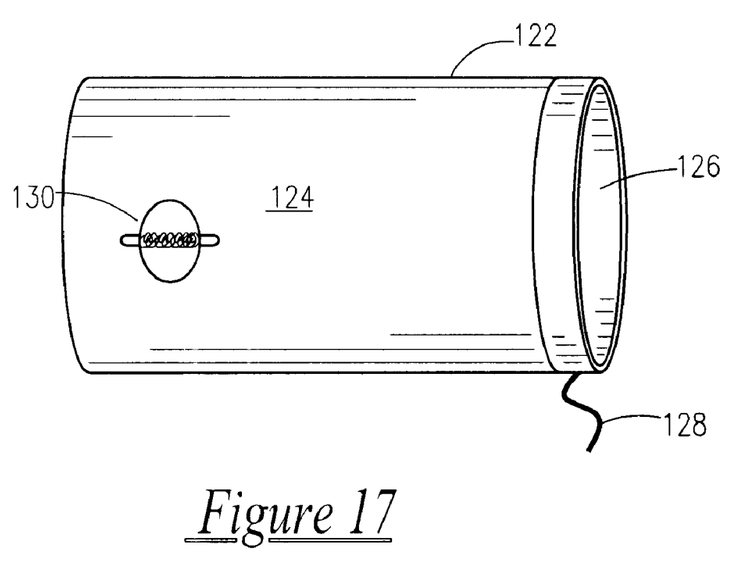
FIG. 17 is a top view of a keyboard cover.

Besides covering the monitor, covers may also cover a keyboard 19a (FIG. 1) as illustrated in FIG. 17. The keyboard cover 122 consists of an elongated pouch 124 constructed preferably of the same material and having the same design or pattern as the cover 10. Alternatively, the keyboard cover 122 can have a design that cooperates with the cover 10. For example, if the cover 10 includes appendages of a dog, then the keyboard cover 122 can have the design of a bone.

The keyboard pouch 124 has an opening 126 at one end for receiving the keyboard. Further, a drawstring 128 can be provided for closing the opening 126.

In addition, one or more stuffed anatomically shaped members 130 can be stitched to the keyboard cover 122. For example, a head, arms, and legs.

Figure 18:
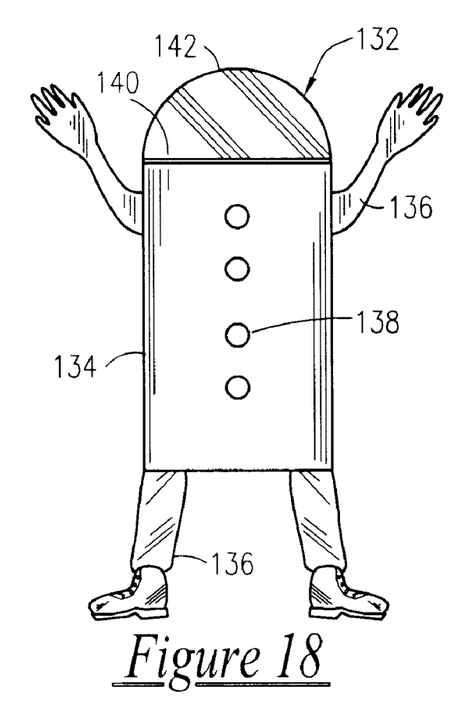
FIG. 18 is a top view of a mouse cover.

The present invention also includes a mouse cover 132 as shown in FIG. 18 for covering the mouse 19b (FIG. 1). The mouse cover 132 consists of a pouch 134 adapted for receiving the mouse and preferably is constructed of the same or like material use in constructing the computer screen cover 10. Alternatively, the mouse cover 132 can have a design that cooperates with the screen cover 10, yet of different material. Also, if desired, the mouse cover can have one or more stuffed anatomical members 136 attached to the pouch 134.

The pouch 134 has an opening 140 proximate to one end 142 for receiving the mouse. If desired, a drawstring (not shown) or other means can be used to close the opening 140.

While specific embodiments have been illustrated and described, numerous modifications come to mind without significantly departing from the spirit of the invention and the scope of protection is only limited by the scope of the accompanying claims.

I claim:

1. A cover for a computer monitor having a visual display screen, the cover comprising:

a top panel and a pair of side panels cooperatively forming a containment member adapted for receiving the computer monitor; and a plurality of appendages extending from said containment member, said appendages cooperating to form an image; and wherein said side panels are not connected to one another below said visual display screen.

2. The cover of claim 1 including a front panel coupled to the top panel and the side panels, the front panel adapted to overlay said visual display screen, wherein the appendages are attached to the containment member.

3. The cover of claim 2 wherein said appendages are attached to said containment member proximate to the front panel.

4. The cover of claim 3 wherein the cover includes a keyboard cover having a complementary image.

5. The cover of claim 2 wherein at least one of said top panel, said front panel, and said pair of side panels is a plush fabric.

6. The cover of claim 2 wherein at least one of said top panel, said front panel, and said pair of side panels includes a plurality of ventilating apertures.

7. The cover of claim 2 wherein the top panel includes a front portion and a back portion, and the back portion is constructed of a permeable material for cooperative ventilation with vents in the monitor.

8. The cover of claim 7 including a back panel attached to the top panel and the side panels, wherein a portion of said back panel is constructed of a permeable material for cooperative ventilation with vents in the monitor.

9. The cover of claim 2 including a back panel attached to the top panel and the side panels.

10. The cover of claim 2 including a back panel partially constructed of a permeable material for cooperating with vents in the monitor.

11. The cover of claim 2 including a pocket attached to one of the panels.

12. The cover of claim 2 including a pocket attached to one of the side panels.

13. The cover of claim 2 wherein the appendages consist of stuffed anatomically shaped members.

14. The cover of claim 13 wherein the stuffed anatomically shaped members resemble portions of a cow.

15. The cover of claim 13 wherein the stuffed anatomically shaped members resemble portions of a dinosaur.

16. The cover of claim 13 wherein the stuffed anatomically shaped members resemble portions of a lion.

17. The cover of claim 13 wherein the stuffed anatomically shaped members resemble portions of a mouse.

18. The cover of claim 13 wherein the stuffed anatomically shaped members resemble portions of a bear.

19. The cover of claim 13 wherein the stuffed anatomically shaped members resemble portions of a tiger.

20. The cover of claim 13 wherein the stuffed anatomically shaped members resemble portions of a dog.

21. The cover of claim 13 wherein the stuffed anatomically shaped members resemble portions of a person.

22. The cover of claim 2 wherein the front panel includes a door.

23. The cover of claim 2 including means for removably securing the front panel from the top and side panels.

24. The cover of claim 2 wherein the front panel is visually transparent.

25. The cover of claim 2 wherein the front panel is substantially transparent.

26. The cover of claim 25 wherein the front panel includes a glare screen.

27. The cover of claim 2 wherein the front panel is a flap and the appendages are attachable to the flap.

28. The cover of claim 2 including rigid supports attached to the side panels.

29. The cover of claim 2 wherein the cover includes a keyboard cover having a complementary image.

30. The cover of claim 1 wherein said appendages are imprinted on the outer surface of the containment member.

31. A cover for a computer monitor having a visual display screen, the cover comprising:

a top panel and a pair of side panels cooperatively forming a containment member adapted for receiving the computer monitor, said top panel and side panels substantially constructed of a pliable material;

a plurality of appendages extending from said containment member, said appendages cooperating to form an image; and a front panel coupled to the top panel and the side panels, the front panel adapted to overlay said visual display screen, wherein the appendages are attached to the containment member; and wherein the front panel includes a pair of mutually attachable doors.

* * * * *